United States Patent [19]

Ott

[11] 3,854,923

[45] Dec. 17, 1974

[54] PROCESS FOR PRODUCING AMMONIACAL SOLUTIONS OF ZINC ALKANOATES

[75] Inventor: Louis E. Ott, St. John, Ind.

[73] Assignee: Standard Oil Company, Chicago, Ill.

[22] Filed: Oct. 5, 1973

[21] Appl. No.: 404,366

Related U.S. Application Data

[62] Division of Ser. No. 198,963, Nov. 15, 1971, abandoned.

[52] U.S. Cl.................. 71/1, 71/64 C, 260/429.9
[51] Int. Cl............................................ C05d 9/02
[58] Field of Search............. 260/429.9; 71/1, 64 C, 71/54, 59, 58

[56] References Cited
UNITED STATES PATENTS

| | | | |
|---|---|---|---|
| 1,217,862 | 2/1917 | Gerngross | 260/429.9 |
| 2,157,767 | 5/1939 | Long | 260/429.9 |
| 2,335,101 | 11/1943 | Belzer et al. | 260/429.9 |
| 2,434,402 | 1/1948 | Fleer | 260/429.9 |
| 2,452,003 | 10/1948 | Weker | 260/429.9 |
| 2,957,762 | 10/1960 | Young | 71/59 |
| 2,976,138 | 3/1961 | Hester | 71/1 |
| 3,647,411 | 3/1972 | Stevens | 71/1 |

FOREIGN PATENTS OR APPLICATIONS

| | | | |
|---|---|---|---|
| 1,198,060 | 7/1970 | Great Britain | 260/429.9 |

OTHER PUBLICATIONS

The Condensed Chemical Dictionary, May 26, 1971, pg. 948.

Primary Examiner—Samih N. Zaharna
Assistant Examiner—Richard Barnes
Attorney, Agent, or Firm—Werten F. W. Bellamy; Arthur G. Gilkes; William T. McClain

[57] ABSTRACT

Aqueous ammoniacal ionic solutions of zinc alkanoates, particularly zinc acetate, containing up to about 20 wt. percent zinc, provide soluble zinc for plant nutrient purposes. The solution is at least 10 percent weight water and includes at least 4 mols of ammonia per mol of zinc.

3 Claims, No Drawings

PROCESS FOR PRODUCING AMMONIACAL SOLUTIONS OF ZINC ALKANOATES

This is a division of application Ser. No. 198,963, filed Nov. 15, 1971, now abandoned.

BACKGROUND OF THE INVENTION

1. Field of the Invention

This invention relates to liquid fertilizers. More particularly, it relates to aqueous ammoniacal ionic solutions of zinc alkanolates, their preparation and use for plant nutrient purposes.

2. Description of Prior Art

Zinc is an essential element in plant nutrition, and a deficiency thereof in the soil is a common cause of poor plant growth. Liquid fertilizers, as clear liquids or suspensions, are advantageously used as vehicles for applying zinc to soil to remedy zinc deficiencies.

Zinc oxide, a substantially water-insoluble solid, is the most economical source of zinc for agricultural purposes. However, since it is insoluble in anhydrous and aqua ammonia, and has only limited solubility or forms water-insoluble zinc ammonium salts in acidic liquid ammonium phosphate fertilizers, it has not been possible to effectively utilize this low cost source of zinc in liquid plant nutrient compositions.

According to information published by Tennessee Valley Authority, zinc oxide is soluble only to the extent of 0.05 wt. percent zinc in 8-24-0 (N-P-K) ammonium orthophosphate fertilizer solutions, which amount is generally insufficient for agricultural purposes; and in high analysis liquid N-P-K fertilizers such as 10-34-0 (N-P-K) ammoniated polyphosphate solutions made from wet process superphosphoric acid, and 11-37-0 (N-P-K) ammoniated polyphosphate solutions made from furnace grade superphosphoric acid, zinc oxide is soluble only to the extent of 2.25 and 3.0 wt. percent zinc, respectively. The improved solubility of zinc oxide in the high analysis liquid fertilizers is apparently due to the metal chelating effect of the polyphosphate ions present in such solutions. While it is possible to obtain practical amounts of zinc in solution via zinc oxide in the aforesaid high analysis liquid fertilizers, it has been found that such solutions are unstable or incompatible, with formation of precipitates, when diluted or blended with other liquid fertilizer ingredients. Consequently, such zinc-containing high analysis fertilizers are only suitable for direct application to soil and not as stock solutions for incorporating zinc in other types of liquid fertilizers such as aqua ammonia, urea ammonium nitrate solutions, low analysis ammonium phosphate solutions, or in mixed N-P-K liquid fertilizers or suspensions containing potassium chloride as the source of potassium. Hence, the fertilizer industry has had to resort to more costly zinc-containing materials, such as zinc sulfate or organic zinc chelates, and techniques for incorporating zinc in liquid fertilizers, especially those containing phosphates.

While many organic or inorganic zinc salts are water-soluble, they are unsuitable for use in phosphate-containing liquid fertilizers because of the formation of insoluble zinc ammonium phosphates which precipitate and cause operational problems. Accordingly, it is desirable to have a liquid zinc-containing product that is soluble in and compatible with all types of N-P-K liquid fertilizers.

SUMMARY OF THE INVENTION

It has been discovered that zinc salts of unsubstituted alkanoic acids having the formula R COOH wherein R is hydrogen or alkyl, preferably $C_{1-5}$ alkyl, and most preferably $C_1$ alkyl, can be used effectively as the source of zinc in liquid fertilizers. The liquid zinc compositions of this invention containing up to about 20 wt. percent zinc consist essentially of an aqueous ammoniacal ionic solution of a zinc alkanoate. The solution contains at least about 4, preferably 6 or more, mols of ammonia per mol of zinc and at least about 10 wt. percent water.

Preparation of the compositions of this invention can be effected by dissolving the zinc alkanoate in aqueous ammonia containing at least 4 mols of ammonia per mol of zinc or by reacting zinc oxide with an ammonia-basic aqueous solution of an ammonium alkanoate containing at least 2 mols of alkanoate anion and at least 4 mols of ammonia per mol of zinc.

The term "zinc alkanoate" as used herein refers to the zinc salt of an unsubstituted saturated aliphatic monocarboxylic acid that is capable of reacting with ammonia and being soluble in aqua ammonia. The zinc salts of formic, acetic, propionic, butanoic, pentanoic and hexanoic acids are suitable for forming the compositions of this invention. Zinc acetate is especially preferred because of its ready availability or ease of formation from zinc oxide and acetic acid. It is to be understood that the zinc alkanoate does not exist per se in the ammoniacal solutions but as ionic species. Accordingly, the solutions of this invention are single-phase homogeneous basic solutions of an ionic complex of water, zinc, ammonium and alkanoate ions. Solutions containing from about 10 to about 20 wt. percent zinc have low vapor pressures and can be handled at ambient temperatures without the necessity of using pressurized equipment.

The term "aqueous N-P-K liquid fertilizers" as used herein refers to the usual liquid fertilizers, clear or suspensions, containing varying amounts of nitrogen, phosphorous, and potassium; such as, aqua ammonia, aqueous urea ammonium nitrate solutions and the various grades of aqueous nitrogen and phosphorus containing products with or without potassium.

The zinc-containing solutions formed in accordance with this invention are useful per se as liquid fertilizers for applying both zinc and primary plant nutrients to the soil. Solutions containing about 5 to 15 wt. percent (about 0.07 to 0.23 mols) of zinc, and an $NH_3/Zn$ molar ratio of about 6 to 9 are especially useful as additive concentrates for incorporating soluble and compatible zinc in other liquid fertilizers such as, aqua ammonia and urea ammonium nitrate solutions, and various grades of the mixed N-P-K clear liquid and suspension fertilizers. The use of the solutions of this invention containing about 5 to 15 wt. percent zinc as stock solutions for providing stable and compatible soluble zinc in liquid fertilizers avoids the need for specially manufacturing and storing zinc-containing liquid fertilizers at the locus of their manufacture. Field blending of such stock solutions with the usual liquid fertilizers to obtain desired amounts of zinc therein at the time of application is satisfactorily obtained. Thus, special techniques heretofore required for incorporating zinc in liquid fertilizers is avoided.

DESCRIPTION OF THE PREFERRED EMBODIMENTS

In the following examples, all parts and percentages are by weight unless otherwise indicated; and the ammonium hydroxide or aqua ammonia reactant contained 28 percent ammonia.

EXAMPLE I

A 10 wt. percent zinc concentrate containing an ammonia to zinc ratio of 7 (7 mols ammonia per mole of zinc) was formed by slowly adding, with cooling to moderate the exothermic reaction, 34.5 parts of zinc acetate dihydrate to 65.5 parts ammonium hydroxide (28 percent ammonia). This solution was used to provide zinc concentrations of 0.25, 1.0 and 2.0 wt. percent zinc in liquid 7-24-3 and 3-10-8 grades of aqueous N-P-K fertilizers and no evidence of incompatibility was found. Zinc utilization by corn fertilized with the mixed fertilizers of this example was equivalent to that obtained from organic chelated zinc.

EXAMPLE II

An aqueous solution containing 10 wt. percent zinc was prepared by adding 12.5 parts zinc oxide to a solution formed by dissolving 25 parts ammonium acetate salt in 62.5 parts ammonium hydroxide. The reaction was conducted at atmospheric pressure and at a temperature in the range of 50° to 80°F. Complete solution of the zinc oxide was obtained within 5 minutes. The solution, containing an ammonia to zinc molar ratio of 8.9 and 2.06 mols of acetate anion per mol of zinc, contained 14.5 percent nitrogen, had a pH of 12.9, a salting-out temperature below −30°F, and a carbon steel corrosion rate of 2.1 mils per year.

EXAMPLE III

A 10 wt. percent zinc solution was formed by adding 12.5 parts of zinc oxide to a stirring solution containing 50 parts of ammonium acetate and 37.5 parts water. The product solution had an ammonia and acetate to zinc ratio of 4.3 and was suitable for blending with aqueous nitrogen solutions.

EXAMPLE IV

Twenty parts of glacial acetic acid was added to 67.5 parts aqua ammonia to form an ammonia-basic aqueous ammonium acetate solution. The solution was cooled to 65°F and 12.5 parts zinc oxide added with a temperature rise to about 105°F. The product solution contained 10 wt. percent zinc.

EXAMPLE V

A product containing 17.5 wt. percent zinc was formed by neutralizing a solution containing 32 parts glacial acetic acid (0.534 mol) and 26 parts water with 20 parts ammonia (1.18 mol) and cooled to 60°F. To this cooled ammonium acetate solution was added 22 parts zinc oxide (0.27 mol) with an exothermic reaction temperature rise to about 105°F. The resultant product solution had an ammonia to zinc molar ratio of 4.3.

EXAMPLE VI

A solution formed by combining 35 parts ammonium hydroxide (29 percent ammonia) and 43 parts of solid ammonium acetate had a temperature of 38°F. To this solution was added, with stirring, 22 parts zinc oxide which was completely dissolved within 45 minutes to form a product solution containing 17.5 wt. percent zinc.

EXAMPLE VII

Sixty-eight parts of zinc acetate dihydrate and 10 parts water were placed in a reactor, provided with cooling means, and ammonia gas passed into the aqueous mixture, with cooling to control the exothermic reaction. After the addition of 22 parts of ammonia, the zinc salt was completely solubilized, giving a product solution containing 20 wt. percent zinc.

EXAMPLE VIII

Fifty parts zinc oxide (0.615 mol) was combined with a solution containing 85.2 parts ammonium formate (1.353 mol), 226 parts ammonium hydroxide (3.77 mol ammonia) and 37 parts water to give a solution containing about 10 percent zinc with an ammonia to zinc molar ratio of about 6.

EXAMPLE IX

To an ammonium butanoate solution formed by combining 27 parts butanoic acid with 56 parts ammonium hydroxide and 4.5 parts water was added 12.5 parts zinc oxide. The product solution contained 10 percent zinc, 2 mols butanoic anion per mol of zinc and had an ammonia to zinc molar ratio of 6.0.

EXAMPLE X

The addition of 12.5 parts zinc oxide to a previously formed ammonium hexanoate solution (36 parts hexanoic acid and 51.5 parts ammonium hydroxide) formed a stable solution containing 10 percent zinc containing an ammonia to zinc molar ratio of 5.5.

EXAMPLE XI

A liquid 3-10-8 (N-P-K) fertilizer, containing only orthophosphate phosphoric acid species as the source of phosphorous, was used to determine the suitability of the zinc solutions of the invention as a source of soluble zinc for incorporation of zinc in liquid fertilizers. When amounts, sufficient to provide from 0.1 to 2 percent zinc in the fertilizer, of the aforesaid exemplary zinc solutions were added to samples of the 3-10-8 liquid fertilizer, clear stable fertilizer solutions were obtained. Thus, formation of liquid zinc-containing solutions in accordance with this invention overcomes the prior art problem of insoluble zinc phosphate formation that occurs when simple water-soluble zinc salts are added to phosphate-containing liquid fertilizers.

EXAMPLE XII

A zinc deficient soil from western Nebraksa, having an alkaline reaction (pH 8.0) was fertilized with three fluid fertilizers containing separately three zinc carriers. The fertilizer materials included a 7-21-7 clear polyphosphate solution, a 6-18-6 orthophosphate solution, and a 4-12-24 polyphosphate suspension. Fertilizer materials were applied at rates of 150 lbs/acre equivalent for the 7-21-7 and the 6-18-6 materials, and at 300 lbs/acre equivalent for the 4-12-24 material to approximate the practice of most farmers. The zinc carriers compared in the study were the 10 percent zinc solution of Example I, zinc sulfate, and a ligninsulfonate. Zinc was applied in the fluid fertilizer materials to the potted soil at rates of 0.0, 0.312, 1.25, 5.0, and 20.0 lbs/acre equivalent. Pots were separately planted to two single cross corn hybrids, Wf9 × Hy and N6 × N15. These hybrid lines are found in the majority of hybrid corn grown in the midwest. Plants were grown in the greenhouse environment for 8 weeks and watered daily by weight using double-distilled water to approximately two-thirds of the field capacity moisture content of the soil. Plant samples, taken at the end of 8 weeks, were cut off just above the ground level, dried, weighed, and ground in a stainless steel mill for analysis by X-ray spectrograph for total zinc uptake.

Tables I and II summarize the data obtained in the study of the comparison of the effectiveness of the zinc acetate additive of this invention with two standard zinc carriers. These data are an average of two replications of each treatment. In general, the zinc acetate was more effective than zinc sulfate and only slightly less effective than the ligninsulfonate carrier as measured by the total zinc uptake by the plants.

TABLE I

| Zinc applied lbs/acre | Single cross corn hybrid, Wf9 × Hy Total zinc uptake in microgram per plant | | |
|---|---|---|---|
| | Zinc acetate | Zinc sulfate | Ligninsulfonate |
| 7-21-7 clear polyphosphate solution | | | |
| 0.0 | 31 | 31 | 31 |
| 0.312 | 119 | 133 | 129 |
| 1.25 | 131 | 91 | 246 |
| 5.0 | 170 | 67 | 196 |
| 20.0 | 119 | 53 | 152 |
| 6-18-6 orthophosphate solution | | | |
| 0.0 | 21 | 21 | 21 |
| 0.312 | 80 | 22 | 74 |
| 1.25 | 163 | 21 | 190 |
| 5.0 | 177 | 19 | 205 |
| 20.0 | 298 | 126 | 278 |
| 4-12-24 polyphosphate suspension | | | |
| 0.0 | 22 | 22 | 22 |
| 0.312 | 106 | 96 | 126 |
| 1.25 | 160 | 117 | 268 |
| 5.0 | 153 | 130 | 291 |
| 20.0 | 282 | 190 | 220 |

TABLE II

| Zinc applied lbs/acre | Single cross corn hybrid, N6 × N15 Total zinc uptake in microgram per plant | | |
|---|---|---|---|
| | Zinc acetate | Zinc sulfate | Ligninsulfonate |
| 7-21-7 clear polyphosphate solution | | | |
| 0.0 | 62 | 62 | 62 |
| 0.312 | 172 | 152 | 284 |
| 1.25 | 198 | 221 | 296 |
| 5.0 | 179 | 169 | 388 |
| 20.0 | 367 | 135 | 372 |
| 6-18-6 orthophosphate solution | | | |

TABLE II—Continued

| | | | |
|---|---|---|---|
| 0.0 | 56 | 56 | 56 |
| 0.312 | 54 | 37 | 153 |
| 1.25 | 378 | 35 | 354 |
| 5.0 | 193 | 192 | 310 |
| 20.0 | 111 | 112 | 236 |
| 4-12-24 polyphosphate suspension | | | |
| 0.0 | 80 | 80 | 80 |
| 0.312 | 184 | 102 | 170 |
| 1.25 | 383 | 147 | 409 |
| 5.0 | 360 | 118 | 325 |
| 20.0 | 148 | 109 | 274 |

The aforesaid data show that use of the liquid zinc micronutrient compositions of this invention as the source of zinc in the fertilization of growing plants is assimilable by the growing plants and not made unavailable to the plants by chemicals in the soil or in the presence of chloride ions present in the 4-12-24 suspension. It should also be noted that the two hybrids show a difference in their ability to assimilate zinc present in the soil.

It will be apparent to one skilled in the fertilizer art that the present invention provides a simple and effective means for forming the zinc content solutions and a means of utilizing zinc oxide as the source of zinc in liquid fertilizers. In addition to their utility in liquid fertilizers, the solutions are also useful as corrosion inhibitors in highly corrosive aqueous ammoniacal solutions containing nitrate, sulfate, and chloride anions. Further, the low corrosivity characteristics of the zinc-containing solutions of the invention permits their storage and handling in mild carbon steel and thus avoids the necessity of using special metals such as stainless steel.

I claim:

1. The method of preparing a liquid zinc micronutrient composition consisting of an aqueous ammoniacal ionic solution of a zinc alkanoate containing at least two mols of $C_{1-6}$ alkanoic acid anion per mol of zinc, at least about 4 mols of ammonia per mol of zinc, and at least 10 weight percent of water which comprises reacting zinc oxide, in an amount sufficient to provide from about 5 to about 15 weight percent zinc in said composition, with an ammonia-basic aqueous ammonium alkanoate solution consisting of at least two mols of $C_{1-6}$ alkanoic acid anion per mol of zinc, at least 4 mols of ammonia per mol of zinc provided by zinc oxide, and at least 10 weight percent water.

2. The method of claim 1 wherein said alkanoate is ammonium acetate.

3. The method of claim 1 wherein said alkanoic acid is acetic acid.

* * * * *

PO-1050
(5/69)

UNITED STATES PATENT OFFICE
CERTIFICATE OF CORRECTION

Patent No. 3,854,923            Dated December 17, 1974

Inventor(s) Louis E. Ott

It is certified that error appears in the above-identified patent and that said Letters Patent are hereby corrected as shown below:

In the Abstract, lines 4-5, "10 percent weight" should be -- 10 percent by weight --.

Column 1, line 10, "alkanolates" should be -- alkanoates --.

Column 5, line 50, The heading "6-18-6 orthophosphate solution" should come after "TABLE II - Continued" at top of Column 6.

Signed and sealed this 8th day of April 1975.

(SEAL)
Attest:

RUTH C. MASON
Attesting Officer

C. MARSHALL DANN
Commissioner of Patents
and Trademarks